United States Patent
Lawandy

[11] Patent Number: 5,882,779
[45] Date of Patent: Mar. 16, 1999

[54] SEMICONDUCTOR NANOCRYSTAL DISPLAY MATERIALS AND DISPLAY APPARATUS EMPLOYING SAME

[75] Inventor: Nabil M. Lawandy, Providence, R.I.

[73] Assignee: Spectra Science Corporation, Providence, R.I.

[21] Appl. No.: 795,542

[22] Filed: Feb. 6, 1997

Related U.S. Application Data

[62] Division of Ser. No. 335,683, Nov. 8, 1994, abandoned.

[51] Int. Cl.$^6$ .............................. H05B 33/00; B05D 5/06; B32B 5/16
[52] U.S. Cl. .......................... 428/323; 428/328; 428/331; 428/690; 428/691; 428/917; 313/485; 313/486; 313/495; 313/502; 313/503; 313/467; 313/469; 257/102; 257/103; 438/34; 438/46; 438/63; 438/73; 427/64; 427/71
[58] Field of Search .................................... 428/323, 328, 428/330, 331, 409, 689, 690, 691, 696, 917; 313/485, 486, 495, 496, 502, 503, 467, 469; 372/43; 136/250; 257/88, 102, 103; 427/64, 71; 438/22, 34, 45, 46, 63, 73, 962

[56] References Cited

U.S. PATENT DOCUMENTS

| | | | |
|---|---|---|---|
| 3,560,783 | 2/1971 | Shortes | 313/92 |
| 3,575,627 | 4/1971 | Nicoll | 313/92 |
| 3,583,788 | 6/1971 | Lee et al. | 350/160 |
| 3,681,638 | 8/1972 | Bleha, Jr. et al. | 313/68 D |
| 3,699,374 | 10/1972 | Scholl et al. | 313/94 |
| 3,976,361 | 8/1976 | Fraas et al. | 350/160 LC |
| 4,073,989 | 2/1978 | Wainer | 428/131 |
| 4,081,716 | 3/1978 | Uemura | 313/63 |
| 4,082,889 | 4/1978 | DiStefano | 428/328 |
| 4,559,116 | 12/1985 | Ellis et al. | 204/129.3 |
| 4,625,071 | 11/1986 | Delahoy et al. | 136/250 |

(List continued on next page.)

OTHER PUBLICATIONS

Lubomir Spanhel, Markus Haase, Hosrt Weller, and Arnim Hengein, Photochemistry of Colloidal Semiconductors. 20. Surface Modification and Stability of Strong Luminescing CdS Particles, J. Am. Chem. Soc. 1987, 109, 5649–5655.

Ramesh Bhargava, Doped Nanochrystals of Semiconductors –New Class of Luminescent Materials, (date and source not given).

Stephanie A. Weiss, Photonics Technology World, Field Emissions Technology Promises Low–Power Displays, Jul. 1994, p. 42.

R.N. Bhargava and D. Gallagher, Optical Properties of Manganese–Doped Nanocrystals of ZnS vol. 72, No. 3, pp. 416–419, Physical REview Letters (1994).

C.B. Murray, D.J. Norris, and M.G. Bawendi, Synthesis and Characterization of Nearly Monodisperse CdE (E=S.Se.Te) Semiconductor Nanocrystallites, J. Am. Chem. Soc., vol. 115 No. 19, 1993, pp. 8706–8715.

*Primary Examiner*—Marie Yamnitzky
*Attorney, Agent, or Firm*—Perman & Green, LLP

[57] ABSTRACT

A class of high efficiency (e.g., ≧20%) materials for use as display pixels to replace conventional phosphors in television, monitor, and flat panel displays. The materials are comprised of nanocrystals such as $CdS_xSe_{1-x}$, CuCl, GaN, $CdTe_xS_{1-x}$, ZnTe, ZnSe, ZnS, or porous Si or Ge alloys which may or may not contain a luminescent center. The nanocrystals may be doped with a luminescent center such as $Mn^{2+}$ or a transition metal. The nanocrystals have passivated surfaces to provide high quantum efficiency. The nanocrystals have all dimensions comparable to the exciton radius (e.g., a size in the range of approximately 1 nm to approximately 10 nm). A quantum dot nanocrystal display phosphor that has a size selected for shifting an emission wavelength of a constituent semiconductor material from a characteristic wavelength observed in the bulk to a different wavelength. A field effect flat panel display is described that employs the nanocrystals of this invention, as are embodiments of plasma displays and fluorescent light sources.

15 Claims, 1 Drawing Sheet

U.S. PATENT DOCUMENTS

| | | | |
|---|---|---|---|
| 4,841,293 | 6/1989 | Takimoto | 340/763 |
| 5,157,674 | 10/1992 | Lawandy | 372/22 |
| 5,233,621 | 8/1993 | Lawandy | 372/22 |
| 5,253,258 | 10/1993 | Lawandy | 372/22 |
| 5,358,600 | 10/1994 | Cahnham et al. | 156/644 |
| 5,422,489 | 6/1995 | Bhargava | 250/488.1 |
| 5,422,907 | 6/1995 | Bhargava | 372/68 |
| 5,434,878 | 7/1995 | Lawandy | 372/43 |
| 5,442,254 | 8/1995 | Jaskie | 313/485 |
| 5,446,286 | 8/1995 | Bhargava | 250/361 R |
| 5,454,915 | 10/1995 | Shor et al. | 204/129.3 |
| 5,455,489 | 10/1995 | Bhargava | 315/169.4 |
| 5,469,020 | 11/1995 | Herrick | 313/511 |
| 5,474,591 | 12/1995 | Wells et al. | 75/351 |
| 5,505,928 | 4/1996 | Alivisatos et al. | 423/299 |
| 5,585,640 | 12/1996 | Huston et al. | 250/483.1 |
| 5,607,876 | 3/1997 | Biegelsen et al. | 437/129 |

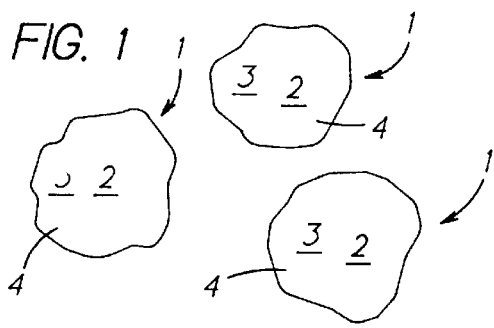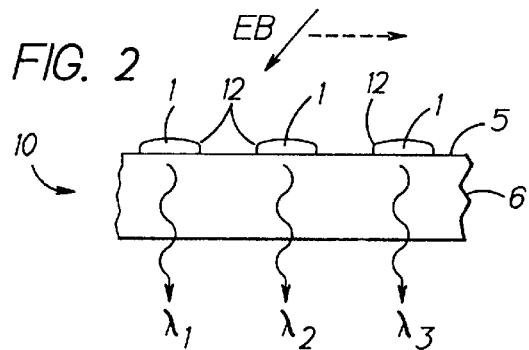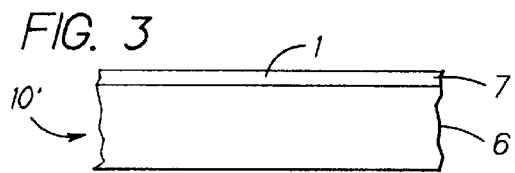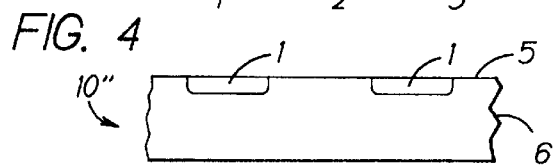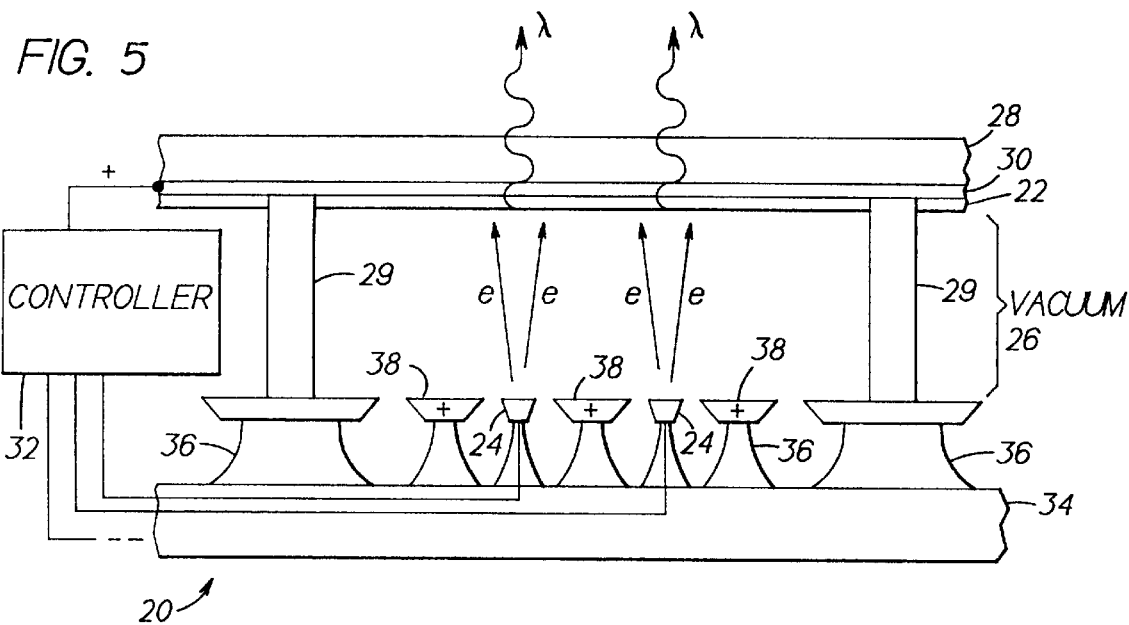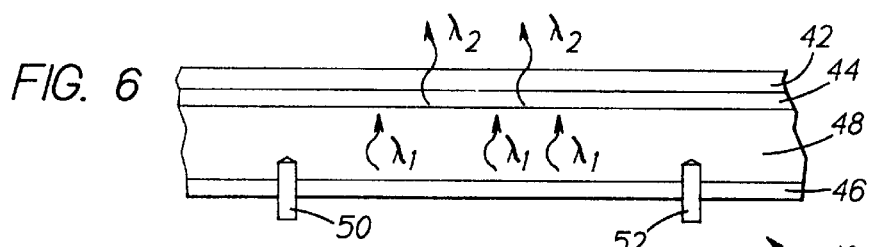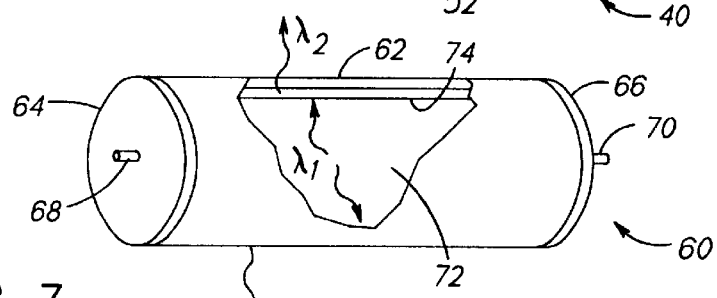

SEMICONDUCTOR NANOCRYSTAL DISPLAY MATERIALS AND DISPLAY APPARATUS EMPLOYING SAME

This is a divisional of application Ser. No. 08/335,683 filed on Nov. 8, 1994 now abandoned.

FIELD OF THE INVENTION

This invention relates generally to materials suitable for emitting electromagnetic radiation with visible wavelengths when suitably excited, and further relates to display apparatus having a display screen that contains such materials.

BACKGROUND OF THE INVENTION

Phosphorescent materials or phosphors have been employed for a number of years in the construction of cathode ray tubes having a display screen that is excited by an electron beam. When struck by the electron beam the phosphor material absorbs energy from the beam and subsequently re-emits the energy as electromagnetic radiation with wavelengths within the visible range.

Representative U.S. Patents in this general area include the following.

Wainer (U.S. Pat. No. 4,073,989) discloses a cadmium sulfide phosphor that may be deposited as ultra-fine particles on a glass or quartz base.

DiStefano (U.S. Pat. No. 4,082,889) discloses a cadmium sulfide (CdS) semiconductor material. Both the Wainer '989 and DiStefano '889 patents disclose the combination of CdS and ZnS in at least one embodiment. The luminescent layer as practiced by DiStefano comprises a polycrystalline thin film 40 of semiconductor material forming individual grains 36 oriented with random size, orientation, and configuration. The typical size of each grain 36 ranges from about 1 micron to about 100 microns. The film 40 is conductive in the lateral direction. A thin skin 35 of majority type dopant forms a layer which preferably covers all surfaces, whether they be the film surface 34, a grain boundary 38, or the interface 42 between the film 40 and the substrate 32.

Delahoy (U.S. Pat. No. 4,625,071) discloses cadmium sulfide semiconductor particles in a necklace configuration that range in size from 10 to about 3000 angstroms.

Mie (U.S. Pat. No. 4,081,716) discloses a fluorescent display element having an integrated semiconductor element 3 and a cadmium sulfide fluorescent display element.

Ellis (U.S. Pat. No. 4,559,116), Fraas et al. (U.S. Pat. No. 3,976,361) and Lee (U.S. Pat. No. 3,583,788) disclose cadmium sulfide semiconductors and/or graded cadmium sulfide crystals with and without other materials.

In an article entitled "Photochemistry of Semiconductor Colloids. 17. Strong luminescing CdS and CdS-$Ag_2S$ Particles", Ber. Bunsenges Phys. Chem. 91, 88–94 (1987), L. Spanhel, H. Weller, A. Fojtik and A. Henglein, report the preparation of Q-CdS sols which fluoresce with quantum yields said to be close to 100%. Strong fluorescence is said to occur when defect sites, at which radiationless recombination takes place, are blocked.

In a paper entitled "Doped Nanocrystals of Semiconductors-A New Class of Luminescent Materials", The 1993 International Conference on Luminescence, TH1B-2, Aug. 9–13, 1993, Univ. of Conn., Storrs, Conn., R. N. Bhargava reports the incorporation of a luminescent center ($Mn^{2+}$) in nanosize (30 Å–70 Å) particles of ZnS. The nanosize ZnS particles are said to show an increased energy bandgap due to quantum confinement, which is also said to effect the recombination kinetics of the $Mn^{2+}$ luminescence. The 1.7 millisecond $Mn^{2+}$ decay time in the bulk is reported to be shortened to about 3 nanoseconds after several hours of curing with UV radiation (300 nm).

In this regard reference is also made to a publication entitled "Optical Properties of Manganese-Doped Nanocrystals of ZnS", Physical Review Letters, Vol. 72, No. 3, pgs. 416–419, Jan 17, 1994, by R. N. Bhargava and D. Gallagher.

Both of these publications describe a method of doping ZnS nanocrystals with Mn.

SUMMARY OF THE INVENTION

This invention teaches the use of a class of high efficiency (e.g., ≧20%) materials as pixels to replace conventional phosphors in electrically and optically excited television displays, flat panel displays, and illumination sources in general. The materials are comprised of nanocrystals containing a crystalline semiconductor such as $CdS_xSe_{1-x}$, CuCl, ZnSe, GaN, $CdTe_xS_{1-x}$, ZnTe, ZnS, or porous Si or Ge alloys which may or may contain a luminescent center. That is, the semiconductor material is comprised of at least one of a Group II–VI semiconductor material, a Group III–V semiconductor material, a Group I–VII semiconductor material, and a Group IV semiconductor material. The nanocrystals may be doped with a luminescent center such as $Mn^{2+}$ or a transition metal. The nanocrystals have passivated surfaces to provide high quantum efficiency.

In accordance with an aspect of this invention, the nanocrystals have all three dimensions comparable to the exciton radius within the semiconductor material in order to enhance electron-hole overlap as well as to limit the number of phonon modes available for non-radiative decay.

The invention further teaches a quantum dot nanocrystal display phosphor that has a size selected for shifting an emission wavelength of a constituent semiconductor material from a characteristic wavelength observed in the bulk to a different wavelength.

A flat panel display embodiment is described that employs the nanocrystals of this invention. Also described are embodiments of plasma discharge displays and fluorescent light sources.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a magnified view showing a plurality of the nanocrystals of this invention;

FIGS. 2–4 are each an enlarged cross-sectional view (not to scale) of a display screen that includes the nanocrystals of FIG. 1;

FIG. 5 is an enlarged cross-sectional view, not to scale, of a flat panel display that is constructed in accordance with an aspect of this invention;

FIG. 6 is an enlarged cross-sectional view, not to scale, of a plasma discharge display that is constructed in accordance with an aspect of this invention; and FIG. 7 is an elevational partially cut-away view, not to scale, of a fluorescent light source that is constructed in accordance with an aspect of this invention.

DETAILED DESCRIPTION OF THE INVENTION

As is indicated in the above-referenced Bhargava publications, doped nanocrystals have been studied in powder form and have been found to exhibit radiative lifetimes of the order of several nanoseconds, as opposed to the same bulk materials which exhibit millisecond lifetimes.

Undoped nanocrystal materials such as $CdS_xSe_{1-x}$ have exhibited radiative lifetimes of nanoseconds, as would be expected for such direct bandgap materials.

The inventor has realized that the short radiative lifetime in both these systems results directly in a high quantum efficiency and a high saturation level for either optical or electrical excitation applications. The short lifetimes are believed to also result in a million-fold increase in the current required to saturate the luminous output of this material when used as a phosphor in, by example, either a cathode ray tube (CRT) or a Field Emission Flat Panel Display. In other words, the material provides a substantially non-saturable phosphor material when used with conventional electron beam current levels. In addition the short lifetime eliminates persistence problems associated with currently available red phosphors staying "on" for too long a time after an excitation beam has moved to another pixel.

In accordance with this invention a selected semiconductor material, such as $CdS_xSe_{1-x}$, CuCl, GaN, $CdTe_xS_{1-x}$, ZnTe, ZnSe, ZnS, or porous Si or Ge alloys, which may or may not contain a luminescent center, is reduced, such as by a mechanical process, to a nanocrystal form. The selected material may instead be precipitated from an organometallic reaction to form the nanocrystals. In accordance with an aspect of this invention the individual nanocrystals are formed or selected so as to have all three dimensions comparable to an expected exciton radius within the selected semiconductor material, where an exciton is considered to be a coupled electron-hole pair. This beneficially enhances electron-hole radiative recombination by increasing the electron-hole overlap and, in addition, the small size allows for a reduction in the number of low energy phonons available for non-radiative decay. Non-radiative decay is undesirable in that it reduces quantum efficiency. By example, the size of the individual nanocrystals can be selected by controlling the nucleation process in the colloid (for example, by controlling the pH), and/or by sedimentation or filtering.

In general, the semiconductor material is comprised of at least one of a Group II–VI semiconductor material, a Group III–V semiconductor material, a Group I–VII semiconductor material, and a Group IV semiconductor material. A typical exciton radius for the semiconductor materials of interest herein results in a nanocrystal having all three dimensions in the range of approximately 1 nm to approximately 10 nm. The value of the exciton radius is a function of the coulomb attraction between the electron and the hole, and the effective masses of the electron and the hole within the crystalline lattice of the semiconductor material.

The nanocrystals may next be doped with a luminescent center, such as $Mn^{2+}$, or a transition metal (elements 21–29, i.e., scandium through copper; elements 39–47, i.e., yttrium through silver; elements 57 through 79, i.e., lanthanum through gold; and elements from 89 (actinium on). The doping may be accomplished by the use of suitable chemical precursors in the wet chemical colloid route to the preparation of these materials. The selected dopant may be present on the surface of the semiconductor core material, and/or embedded within the crystal lattice of the semiconductor core material. The dopant or luminescent center(s) function as a sink for electrons and/or holes that are generated within the semiconductor core material due the semiconductor core material being excited by an incident electron, typically an electron that originates from an electron source that drives the display. That is, an electron and/or hole that is liberated in the semiconductor core material is used to populate the luminescent center.

The surfaces of the doped nanocrystals are next passivated to eliminate undesirable non-radiative recombination. One suitable passivation process is described by Bhargava et al. Other suitable passivation approaches apply $Cd^+$ or $Ag_2S$ (see the L. Spanhel et al. article cited previously) to the surfaces of the nanocrystals. In general, a number of suitable passivation materials and techniques can be employed for eliminating or suppressing nanocrystal surface states that result in non-radiative recombination and a consequent reduction in quantum efficiency.

It is noted that the dopant (the luminescent center material) can also be employed to passivate the nanocrystal. By example, if the semiconductor material of the nanocrystal core is comprised of CdS, then ZnSe can be employed both as a luminescent center and also to passivate the surface of the CdS semiconductor nanocrystal.

Referring to FIG. 1, and in accordance with an embodiment of this invention, the result of the foregoing process is the production of nanocrystals 1 each comprised of: a core material 2, such as $CdS_xSe_{1-x}$, CuCl, GaN, $CdTe_xS_{1-x}$, ZnTe, ZnSe, ZnS, or a porous Si or Ge alloy; a luminescent center 3, such as atoms of $Mn^{2+}$ or a transition metal that is coupled to the core material for receiving electrons and/or holes therefrom; and a passivated surface 4. Preferably all or at least a significant proportion (e.g., more than 50%) of the nanocrystals 1 have all dimensions comparable to the exciton radius within the semiconductor core material. These dimensions need not be exactly equal to the exciton radius. The dimensions are instead provided so that size quantization effects are observed, as will be described in further detail below.

Furthermore, in some embodiments of the invention the doping of the semiconductor core material with a luminescent center is not required. By example, for certain direct gap binary and tertiary semiconductors the electron/hole recombination at the band-edge results in the generation of wavelengths within the visible spectrum. By example, CdS provides green, CdSe provides red, CdSSe provides a wavelength between green and red (depending on the relative concentrations of S and Se), and GaN provides blue. However, for those semiconductors that emit a non-visible wavelength, for example ZnS which emits in the UV, then the doping with a luminescent center, such as $Mn^{++}$ or a transition metal, provides recombination over a smaller energy gap and the generation of visible light.

Referring to FIG. 2, the nanocrystals 1 are next contacted on to a first major surface 5 of a substrate 6 to form a display screen 10. The substrate 6 is preferably transparent to the wavelengths emitted by the nanocrystals 1 when electrically or optically excited, and may be comprised of glass, quartz, a suitable polymer and/or an electrically conductive transparent substance such as indium-tin-oxide (ITO) or ZnO. By example, the excitation source may be a conventional electron beam (EB) that is scanned across the nanocrystal material in a raster fashion. The nanocrystals 1 are typically localized within regions or pixels 12. Conventional phosphor-type deposition methods can be employed for contacting the nanocrystals 1 into the surface 5. It is, however, within the scope of this invention to provide a substantially uniform layer or coating 7 of the nanocrystals 1 upon the surface 5, as is illustrated in the display screen 10' of FIG. 3. Suitable thicknesses for the pixels 12 or the coating 7 are in the range of thousands of angstroms to serval hundred microns.

Referring to FIG. 4, the nanocrystals 1 may instead be used in a form where they are nucleated directly within the first major surface 5 of the substrate 6. In this embodiment of a display screen 10'' the nanocrystals may be first deposited on the surface 5, as in FIG. 2, and then the substrate 6 is heated to a point that enables the nanocrystals 1 to become entrapped within a region of the substrate 6 that is adjacent to the surface 5. Conventional techniques for forming semiconductor doped glasses may also be employed.

FIG. 5 illustrates a flat panel display embodiment that employs the light emitting nanocrystals of this invention. More specifically, FIG. 5 illustrates a field emission display 20 that directly generates electrons that impinge onto a nanocrystal layer 22. One suitable embodiment for this type of flat panel display is illustrated in an article entitled "Field Emission Technology Promises Low Power Displays", S. A. Weiss, Photonics Spectra, pg. 42, July 1994. A two-dimensional array of cold cathodes or emitters 24 provides a plurality of discrete electron sources. Electrons (e) are accelerated across a vacuum gap 26 defined by spacers 29 under the influence of a bias potential provided from a controller 32 to impinge on the layer 22 that is comprised of the novel nanocrystal light emitters of this invention. The nanocrystal layer 22 is disposed on a surface of a transparent faceplate 28 that includes a transparent conductor 30, such as ITO. The nanocrystal layer 22 may be provided in the form of discrete "dots", as a substantially continuous layer, or integrally formed within a surface as in FIG. 4. In response to the incident electrons the nanocrystals 22 emit visible radiation that passes through the transparent electrode 30 and faceplate 28 to an observer. An insulating baseplate 34 supports the various structures of the flat panel display 20, which further includes an insulator 36 and a positively biased extraction grid 38.

The nanocrystals of this invention are significantly smaller than a typical four to five micrometer size of conventional phosphors, and furthermore can be operated at significantly lower excitation energies. This is due in part to their relatively small size, and to the passivation of their individual surfaces. In addition, an incident electron may result in the formation of less than 10 electron/hole pairs within the semiconductor core region of the nanocrystals of this invention. This contrasts sharply to the possibly hundreds of electron/hole pairs that may be generated within a conventional phosphor.

The nanocrystal phosphor embodiments of this invention may be considered as "quantum dot phosphors", in that they have a size that generally results in size quantization effects.

This size quantization is exploited to produce emissions from display phosphors which are shorter in wavelength than those allowed in the bulk material. The shift towards the blue is given roughly by:

$$E \sim h^2/8a^2(1/m_e + 1/m_h);$$

where a is the particle (nanocrystal phosphor) radius, $m_e$ is the effective mass of the electron, $m_h$ is the effective mass of the hole, and h is Plank's constant.

In accordance with this teaching CdS quantum dot nanocrystal phosphors have been produced which emit in a spectrum from approximately 400 nm to approximately 520 nm, for example 450 nm (blue), whereas the bandgap of pure bulk CdS results in an emission at a characteristic wavelength of about 518 nm.

Another CdS quantum dot nanocrystal phosphor was synthesized using $Cd^+$ passivation under a controlled pH range of nucleation in a manner similar to that disclosed by L. Spanhel et al. The quantum dot nanocrystal phosphor was found to exhibit high quantum efficiency luminescence which peaked at 620 nm. Since this wavelength is significantly longer than the pure CdS bandgap emission (about 518 nm), it is believed that the observed luminescence is most likely due to radiatively efficient surface states created during the passivation of the nanocrystal phosphor. In accordance with this teaching the luminescence range of wavelengths has also been extended to a band extending from approximately 400 nm to approximately 900 nm, again by control of the pH during nucleation.

It should be realized that other materials and material combinations can be employed to practice this invention that those explicitly described above. Furthermore, other suitable processing techniques may be employed to yield the same end result. Also, combinations of nanocrystals comprised of different semiconductor material and/or dopants can be employed together to provide emissions with different wavelengths. By example, in FIG. 2 one pixel may emit a first wavelength ($\lambda_1$), while adjacent pixels emit second and third wavelengths ($\lambda_2$ and $\lambda_3$).

Furthermore a display or display device may be in the form of a cathode ray tube having one or more electron guns, an electroluminescent display, a flat panel display, or any of a number of embodiments wherein an excitation source (e.g., electrical and/or optical) is provided for exciting the light emitting nanocrystal display phosphors of this invention to emit light.

In this regard FIG. 6 is an enlarged cross-sectional view, not to scale, of a plasma discharge display device 40 that is constructed in accordance with an aspect of this invention. A transparent faceplate 42 has a layer 44 of the nanocrystals of this invention disposed on a surface thereof. A backplate 46 defines a cavity 48 within which a gas, for example Xenon, is contained. Electrodes 50 and 52 cause the Xe gas to emit electromagnetic radiation at a first wavelength ($\lambda_1$), for example 140 nm. This radiation is absorbed in the nanocrystal phosphor layer 44 and optically excites same to emit electromagnetic radiation at a second, visible wavelength ($\lambda_2$).

FIG. 7 is an elevational partially cut-away view, not to scale, of a fluorescent light source 60 that is constructed in accordance with an aspect of this invention. A transparent, generally cylindrical envelope 62 is sealed by two endcaps 64 and 66 having electrodes 68 and 70, respectively. The envelope 62 contains a gas 72, for example mercury vapor, and has a nanocrystal phosphor layer 74 disposed on an inner surface thereof. Electrodes 68 and 70 cause the mercury vapor to emit electromagnetic radiation at a first wavelength ($\lambda_1$) for example 246 nm. This radiation is absorbed in the nanocrystal phosphor layer 74 and optically excites same to emit electromagnetic radiation within a band of visible wavelengths generally designated ($\lambda_2$). Due to the high efficiencies that are a characteristic of the nanocrystal phosphors of this invention, an increase in both electrical and optical efficiency is made possible.

The gases used in the previous two embodiments are exemplary. That is, other embodiments of this invention may use other gases such as argon and deuterium. As such, gases that emit in the UV spectrum are preferred for optically exciting the nanocrystal phosphors of this invention when constructing a source of electromagnetic radiation, such as a plasma display and a fluorescent light.

It should thus be understood that while the invention has been particularly shown and described with respect to preferred embodiments thereof, it will be understood by those skilled in the art that changes in form and details may be made therein without departing from the scope and spirit of the invention.

What is claimed is:

1. A display screen having a display surface that is divided into a plurality of pixel regions, comprising:

a substrate having a first major surface and a second major surface opposite the first major surface, said first major surface being said display surface; and a plurality of light emitting nanocrystals disposed within said substrate within each of said plurality of pixel regions adjacent to said first major surface, individual ones of said plurality of nanocrystals comprising, a core comprised of a semiconductor material; and individual ones of said plurality of nanocrystals further comprising a passivated surface; wherein a majority of said plurality of nanocrystals have dimensions selected for providing a size quantization effect.

2. A display screen as set forth in claim 1 wherein said plurality of nanocrystals further comprise a luminescent center that is coupled to said core.

3. A display screen as set forth in claim 2 wherein said semiconductor material is comprised of at least one of a Group II–VI semiconductor material, a Group III–V semiconductor material, a Group I–VII semiconductor material, or a Group IV semiconductor material; and wherein said luminescent center is comprised of an ion or a transition metal.

4. A display screen as set forth in claim 1, wherein said display screen is a component part of a flat panel display.

5. A display screen as set forth in claim 1, wherein said display screen is a component part of a cathode ray tube (CRT) display.

6. A display screen as set forth in claim 1, wherein said display screen is a component part of a field emission display.

7. A display screen as set forth in claim 1, wherein said display screen is a component part of an electroluminescent display.

8. A display screen as set forth in claim 1, and further comprising a transparent electrode disposed over at least one of said first and second major surfaces of said substrate.

9. A display screen having a display surface that is divided into a plurality of pixel regions, comprising:

a substrate having a first major surface and a second major surface opposite the first major surface, said first major surface being said display surface; and a plurality of light emitting nanocrystals disposed beneath said first major surface of said substrate within each of said plurality of pixel regions, individual ones of said plurality of nanocrystals comprising, a core comprised of a semiconductor material selected from the group consisting of a Group II–VI semiconductor material, a Group III–V semiconductor material, a Group I–VII semiconductor material, a Group IV semiconductor material, and combinations thereof, said semiconductor material being doped with a luminescent center; and individual ones of said plurality of nanocrystals further comprising a surface covered with a layer of passivation; wherein a majority of said plurality of nanocrystals have dimensions in the range of about one nanometer to about 10 nanometers.

10. A display screen as set forth in claim 9, wherein said display screen is a component part of a flat panel display.

11. A display screen as set forth in claim 9, wherein said display screen is a component part of a cathode ray tube (CRT) display.

12. A display screen as set forth in claim 9, wherein said display screen is a component part of a field emission display.

13. A display screen as set forth in claim 9, wherein said display screen is a component part of an electroluminescent display.

14. A display screen as set forth in claim 9, and further comprising a transparent electrode disposed over at least one of said first and second major surfaces of said substrate.

15. A method for fabricating a display screen having a display surface that is divided into a plurality of pixel regions, comprising steps of:

providing a substrate having a first major surface and a second major surface opposite the first major surface, said first major surface being said display surface;

depositing a plurality of light emitting nanocrystals at least within each of said pixel regions, individual ones of said plurality of nanocrystals comprising a core comprised of a doped semiconductor material selected from the group consisting of a Group II–VI semiconductor material, a Group III–V semiconductor material, a Group I–VII semiconductor material, a Group IV semiconductor material, and combinations thereof, said core further comprising a surface covered with a layer of passivation, wherein said plurality of nanocrystals have dimensions selected for providing a size quantization effect; and heating said substrate for entrapping deposited light emitting nanocrystals within a portion of said substrate that is adjacent to and that underlies said first major surface within each of said pixel regions.

* * * * *